United States Patent
Mayo et al.

(10) Patent No.: US 7,810,097 B2
(45) Date of Patent: Oct. 5, 2010

(54) PRIORITY ANALYSIS OF ACCESS TRANSACTIONS IN AN INFORMATION SYSTEM

(75) Inventors: Robert N. Mayo, Mountain View, CA (US); Parthasarathy Ranganathan, Palo Alto, CA (US); Robert J. Stets, Jr., Palo Alto, CA (US); Deborah A. Wallach, Emerald Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1515 days.

(21) Appl. No.: 10/629,033

(22) Filed: Jul. 28, 2003

(65) Prior Publication Data

US 2005/0027662 A1  Feb. 3, 2005

(51) Int. Cl.
*G06F 9/46* (2006.01)
*G06F 17/00* (2006.01)
*G06F 7/00* (2006.01)
*G06Q 90/00* (2006.01)

(52) U.S. Cl. .................. 718/104; 705/500; 707/651
(58) Field of Classification Search .............. 709/229, 709/219, 226, 201; 713/324, 330; 600/407; 718/102–105
See application file for complete search history.

(56) References Cited

U.S. PATENT DOCUMENTS

| | | | |
|---|---|---|---|
| 5,504,894 A * | 4/1996 | Ferguson et al. | 707/2 |
| 5,745,758 A * | 4/1998 | Shaw et al. | 718/102 |
| 6,085,216 A * | 7/2000 | Huberman et al. | 718/104 |
| 6,785,794 B2 * | 8/2004 | Chase et al. | 711/170 |
| 6,801,926 B1 * | 10/2004 | Shisler et al. | 709/201 |
| 6,807,572 B1 * | 10/2004 | Yu | 709/219 |
| 6,952,737 B1 * | 10/2005 | Coates et al. | 709/229 |
| 6,988,139 B1 * | 1/2006 | Jervis et al. | 709/226 |
| 7,523,454 B2 * | 4/2009 | Romero et al. | 718/105 |
| 2003/0013951 A1 * | 1/2003 | Stefanescu et al. | 600/407 |
| 2003/0055969 A1 * | 3/2003 | Begun et al. | 709/226 |
| 2003/0149904 A1 * | 8/2003 | Kim | 713/330 |

\* cited by examiner

*Primary Examiner*—Meng-Ai An
*Assistant Examiner*—Eric C Wai

(57) ABSTRACT

An information system that includes mechanisms for assigning incoming access transactions to individual access subsystems based on an analysis of the incoming access transactions. The analysis and assignment of the incoming access transactions may be used to minimize loss of cached data during power reduction in an information system.

18 Claims, 4 Drawing Sheets

PRIORITY ANALYSIS OF ACCESS TRANSACTIONS IN AN INFORMATION SYSTEM

BACKGROUND

A wide variety of information systems may include persistent storage devices along with access subsystems for use in accessing the information held on the persistent storage devices. A data center, for example, may include large volumes of disk drives for persistent storage along with information servers for accessing the information contained on the disk drives.

A client of an information system may access the information system by generating access transactions that target the information stored on the persistent storage devices of the information system. Examples of access transactions include SQL read/write/modify transactions.

An access subsystem may function as a cache of information contained in persistent storage. For example, the main memories in the information servers in a data center may be used as a cache of information contained on the data center disk drives. The caching of information may improve response time when handling access transactions.

An information system having multiple access subsystems may include a mechanism for assigning the incoming access transactions received from clients to individual access subsystems. For example, a data center may include a transaction router that assigns incoming access transactions to individual information servers in a round-robin fashion.

It is often desirable to reduce the power consumption of an information system. In a data center, for example, it may be desirable to reduce power consumption during low use periods in order to reduce the costs of operating the data center. In addition, it may be desirable to reduce the power consumption to reduce heat in the data center environment. A reduction in heat in a data center may increase the reliability of hardware in a data center and may enable more density in data center hardware.

The power consumption in an information system may be reduced by switching off individual access subsystems. In a data center, for example, power consumption may be reduced by switching off individual information servers during low use periods. Unfortunately, the switching off of access subsystems in a prior information systems that assign incoming access transactions to access subsystems in a round-robin fashion may cause the loss of valuable cached data and slow the overall response time in an information system.

SUMMARY OF THE INVENTION

An information system is disclosed that includes mechanisms for assigning incoming access transactions to individual access subsystems based on an analysis of the incoming access transactions. The analysis and assignment of the incoming access transactions may be used to minimize loss of cached data during power reduction in an information system.

An information system according to the present techniques includes a set of access subsystems each for use in accessing a persistent store in the information system and a transaction analyzer that determines a priority metric for each incoming access transaction. A priority metric is used to select which of the access subsystems is to be used when performing the corresponding incoming access transaction.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
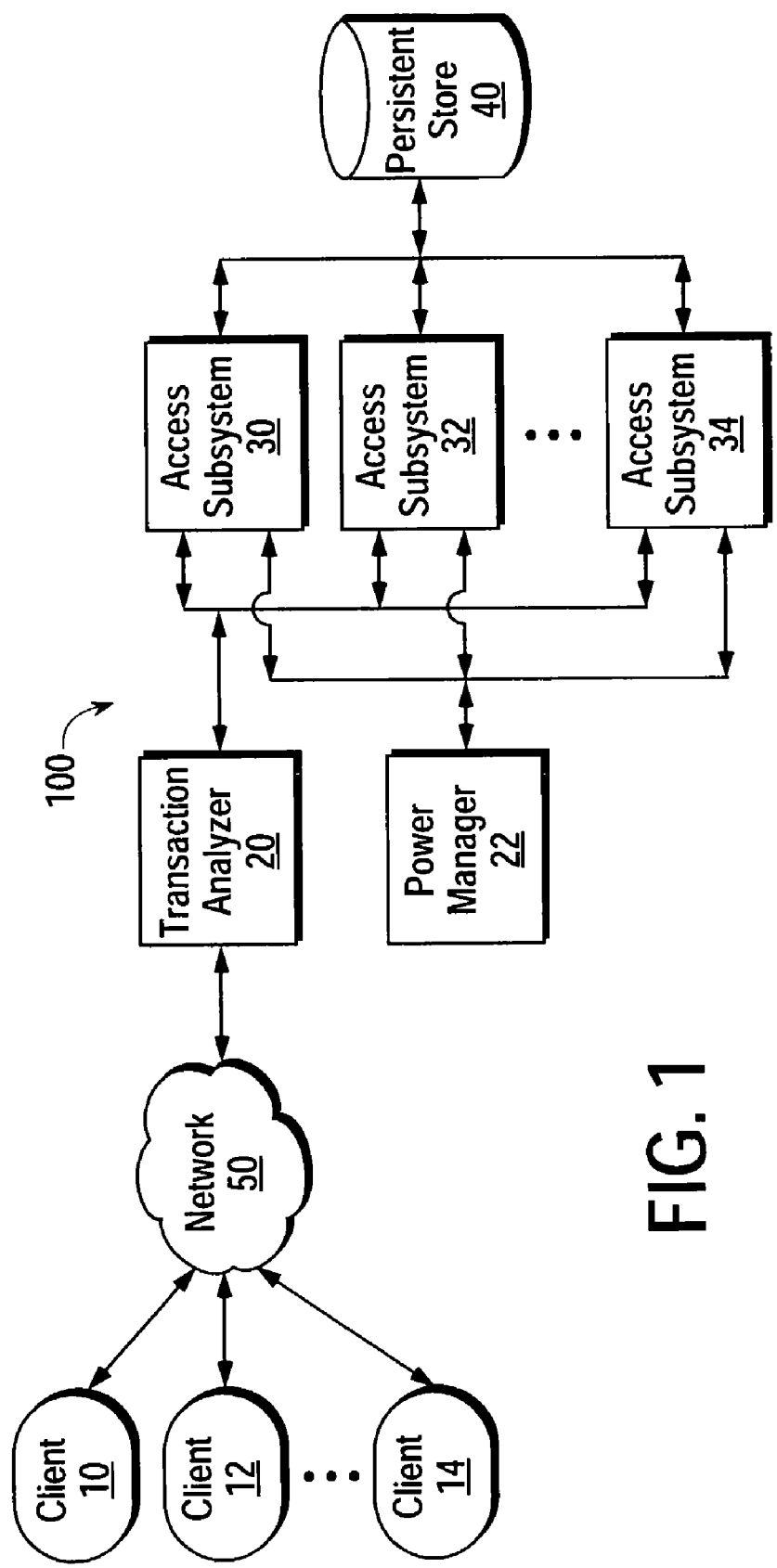
FIG. 1 shows an information system according to the present teachings.

FIG. 1 shows an information system 100 according to the present teachings. The information system 100 includes a persistent store 40 and a transaction analyzer 20 that obtains access transactions via a network 50 from a set of clients 10-14. The access transactions target information held in the persistent store 40. An access transaction may take the form of an SQL transaction.

The information system 100 includes a mechanism for accessing the persistent store 40 that includes a set of access subsystems 30-34. The access subsystems 30-34 may be, for example, information servers or hardware/software subsystems within an information server. The power status of each access subsystems 30-34 is individually controllable.

The information system 100 includes a power manager 22 performs power adaptation by altering the power state of the access subsystems 30-34. For example, an excessive amount of power consumption or excessive heat may cause the power manager 22 to perform power adaptation by switching off one or more of the access subsystems 30-34 or by placing one or more of the access subsystems 30-34 in a reduced power state. Similarly, if the load of incoming access transactions is relatively low then the power manager 22 may perform power adaptation by switching off one or more of the access subsystems 30-34 or by placing one or more of the access subsystems 30-34 in a reduced power state in order to conserve power. In another example, if the load of incoming access transactions is relatively high then the power manager 22 may perform power adaptation by switching on one or more of the access subsystems 30-34 that are in a power off state. Similarly, if the load of incoming access transactions is relatively high then the power manager 22 or some other element of the information system 100 may perform power adaptation by removing the power reduction state of one or more of the access subsystems 30-34 that are in a reduced power state. The power manager 22 may measure response time to access transactions so that an increase in response time may trigger power adaptation.

The above provide a few examples of conditions that may trigger power adaptation automatically using programmed heuristics. A variety of other conditions may cause the power manager 22 to trigger power adaptation. In addition, the power adaptations in the information system 100 may be triggered manually through the intervention of a system administrator. For example, the power manager 22 may generate one or more web pages that enable manual power control using web protocols via the network 50 or an internal network in the information system 100.

Each of the access subsystems 30-34 is assigned a rank for use in power adaptation in the information system 100. The access subsystems 30-34 may be ranked in any manner. For example, if there are N of the access subsystems 30-34 then the access subsystem 30 may be assigned a rank=1 and the access subsystem 32 a rank=2, etc., or visa versa. Any numbering system or rank indicators may be used. More than one of the access subsystems 30-34 may be assigned the same rank and there may be any number of ranks assigned.

The power manager 22 selects the access subsystems 30-34 to be powered down or to be placed in a power reduction state on the basis of their assigned rank. For example, the power manager 22 initially powers down the access subsystem 30-34 having the lowest rank that is currently in a full power state and then powers down the access subsystem 30-34 having the next lowest rank that is currently in a full power state, etc., as needed to accomplish the appropriate power adaptation.

In addition, the power manager 22 selects the access subsystems 30-34 that are to be restored to a full power state on the basis of their assigned rank. For example, the power manager 22 initially restores to full power the access subsystem 30-34 having the highest rank that is currently in an off state or a reduced power state and then powers up the access subsystem 30-34 having the next highest rank that is currently in an off or reduced power state, etc., as needed to accomplish the appropriate power adaptation.

The power manager 22 may notify the transaction analyzer 20 of upcoming changes in the power status of the access subsystems 30-34 so that incoming access transactions a may be handled accordingly.

The transaction analyzer 20 analyzes the content of each incoming access transaction and based on the analysis selects which of the access subsystems 30-34 is to handle each incoming access transaction. In one embodiment, the transaction analyzer 20 determines a priority metric for an incoming access transaction and then selects the currently active one of the access subsystems 30-34 having a rank that best matches the priority metric.

The priority metric for an incoming access transaction may be based on the frequency of occurrence of the transaction. For example, more frequently occurring transactions may be assigned a higher priority metric and higher priority access transactions may be assigned to the higher ranking access subsystems 30-34 that are less likely to be switched off during power adaptation.

The priority metric for an incoming access transaction may be based on the dollar cost of the access transaction. For example, an incoming access transaction may include a dollar cost figure generated in the client 10-14 that originated the access transaction.

The priority metric for an incoming access transaction may be based on the data gathering and/or computational tasks that are to be performed to respond to the access transaction. For example, more complex access transactions may be assigned a higher priority metric and assigned to the higher ranking access subsystems 30-34, or visa versa. The complexity of handling an access transaction may be indicated by the number of database tables from the persistent store 40 that must be referenced and/or the number of field matches that must be performed.

The priority metric for an incoming access transaction may be based on the database tables that it references and the frequency of access of those tables. For example, access transactions that reference more frequently accessed database tables may be assigned a higher priority and assigned to higher ranking access subsystems 30-34 that are less likely to be switched off during power adaptation.

The priority metric for an access transaction may be based on any query constraints contained in the access transaction. For example, a priority metric may be based on which query constraints are more efficient. In another example, a priority metric may based on the size of a database table to which query constraints are to be applied.

The transaction analyzer 20 may maintain a list of database tables contained in the persistent store 40 along with statistics pertaining to prior accesses for each database table. This information may be used in determining frequencies of access or complexities, etc. when determining a priority metric for an incoming access transaction.

Figure 2:
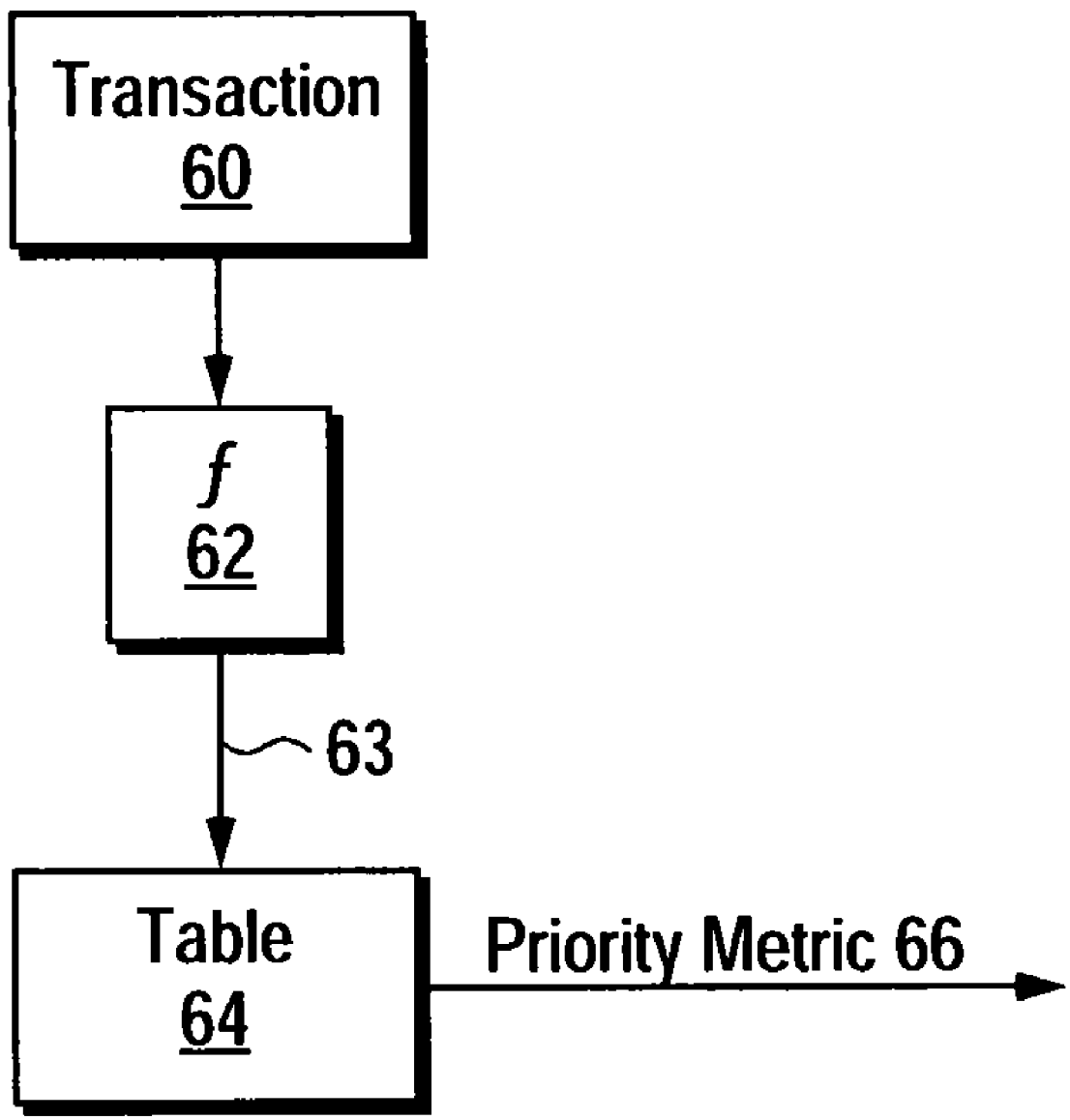
FIG. 2 illustrates the operation of a transaction analyzer in one embodiment.

FIG. 2 illustrates the operation of the transaction analyzer 20 in response to an incoming access transaction 60 in one embodiment. The transaction analyzer 20 may extract a database operator such as UPDATE or SELECT from the transaction 60. The transaction analyzer 20 may extract from the transaction 60 table identifiers and field identifiers that are used as references to tables structures in the persistent store 40. The transaction analyzer 20 may extract constraints such as matching criteria from the transaction 60.

The transaction analyzer 20 applies a function 62 to the information extracted from the transaction 60. The function 62 may be any function. One example is a hash function. For example, the function 62 may be a hash of the field and table identifiers extracted from the transaction 60.

A result 63 of the function 62 provides an index into a table 64 that provides a priority metric 66. In one embodiment, the table 64 stores indications of the frequency of occurrence of a variety of values for the result 63 and the frequency of occurrence indexed by the result 63 may be used as the priority metric 66 or as a basis for the priority metric 66. The transaction analyzer 20 may build the contents of the table 64 over time while handing incoming access transactions.

The priority metric 66 may be a metric that is similar to the ranking of the access subsystems 30-34. For example, if the access subsystems 30-34 are ranked from 1 to N then an access transaction may be assigned a priority metric between 1 and N. In such an embodiment, an access transaction having a priority metric=1 will be handled by the access subsystem 30-34 having a rank=1 and an access transaction having a priority metric=2 will be handled by the access subsystem 30-34 having a rank=2, etc. Alternatively, any type of mapping between ranks of the access subsystems 30-34 and priority metrics may be used.

If a matching low ranking access subsystem 30-34 is not active when an access transaction that yields a low priority metric is received then the transaction analyzer 20 selects the lowest ranking active access subsystem 30-34. In the example 1-N ranking and priority metrics, when the access subsystem 30-34 having a rank=1 is not active an access transaction having a priority metric=1 will be handled by the access subsystem 30-34 having a rank=2 if it is active or by the access subsystem 30-34 having a rank=3 if it is active, etc.

Figure 3:
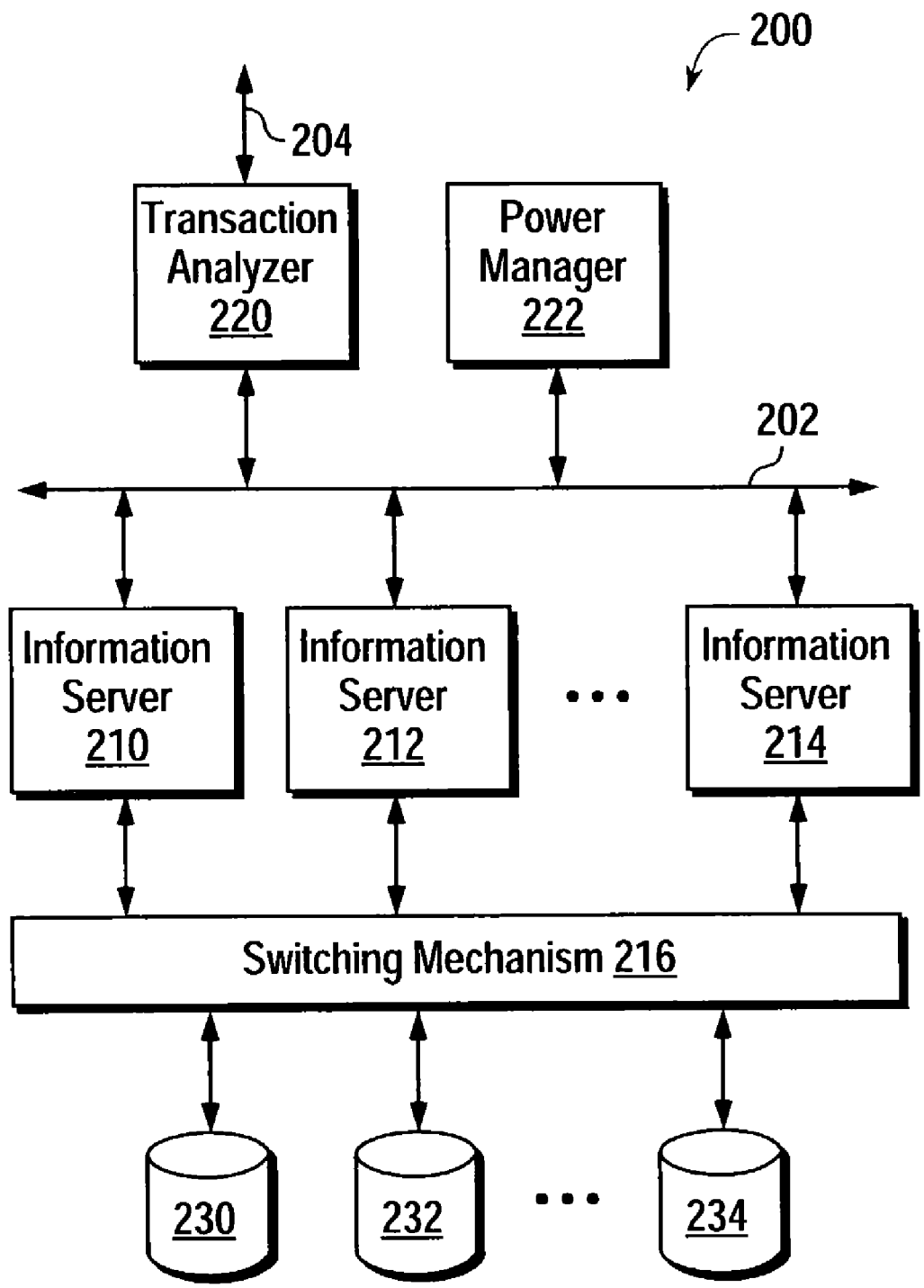
FIG. 3 shows a data center that incorporates the present teachings.

FIG. 3 shows a data center 200 that incorporates the present teachings. The data center 200 includes a set of storage devices 230-234, a set of information servers 210-214, a transaction analyzer 220, and a power manager 222. The data center 200 includes a switching mechanism 216 that enables access to all of the storage devices 230-234 from all of the information servers 210-214.

The storage devices 230-234 provide large scale persistent storage of data for applications implemented in the data center 200. In a database application, for example, the storage devices 230-234 provide a persistent store for database tables and records, etc.

The transaction analyzer 220 obtains incoming access transactions via a communication path 204. For each access transaction the transaction analyzer 220 analyzes the access transaction to generate a priority metric, selects the information server 210-214 that is to handle the access transaction based on the corresponding priority metric and the ranks of the information servers 210-214, and distributes the access transaction to the selected information server 210-214 via an internal network 202.

The information servers 210-214 perform reads from and/or writes to the storage devices 230-234 via the switching mechanism 216 to access persistent data as needed when carrying out the access transactions. Each of the information servers 210-214 includes an internal non-persistent memory, for example random access main memory, that is used as a cache for holding subsets of the data that is held persistently on the storage devices 230-234.

The power manager 222 monitors power consumption and/or environmental and/or incoming access transaction load and/or other conditions in the data center 200 and performs power adaptation when appropriate. The power adaptations by the power manager 222 may also be triggered manually.

The present techniques may increase the likelihood that data for high priority access requests will be cached in the active information servers 210-214 because the information servers 210-214 that handle lower priority access transactions are powered down first. This may minimize the performance degradation that might otherwise occur when servers are powered down without regard to their rank, i.e. the priority of the access transactions that they handle.

The transaction analyzer 220 may be implemented as code on a node having computing resources and communication resources. A transaction analyzer node may be dedicated as a transaction analyzer or perform other application functions. For example, a transaction analyzer may be implemented as code on a web server that issues access transactions to the information servers 210-214. The data center 200 may include multiple transaction analyzers that receive, analyze, and distribute incoming access transactions.

Figure 4:
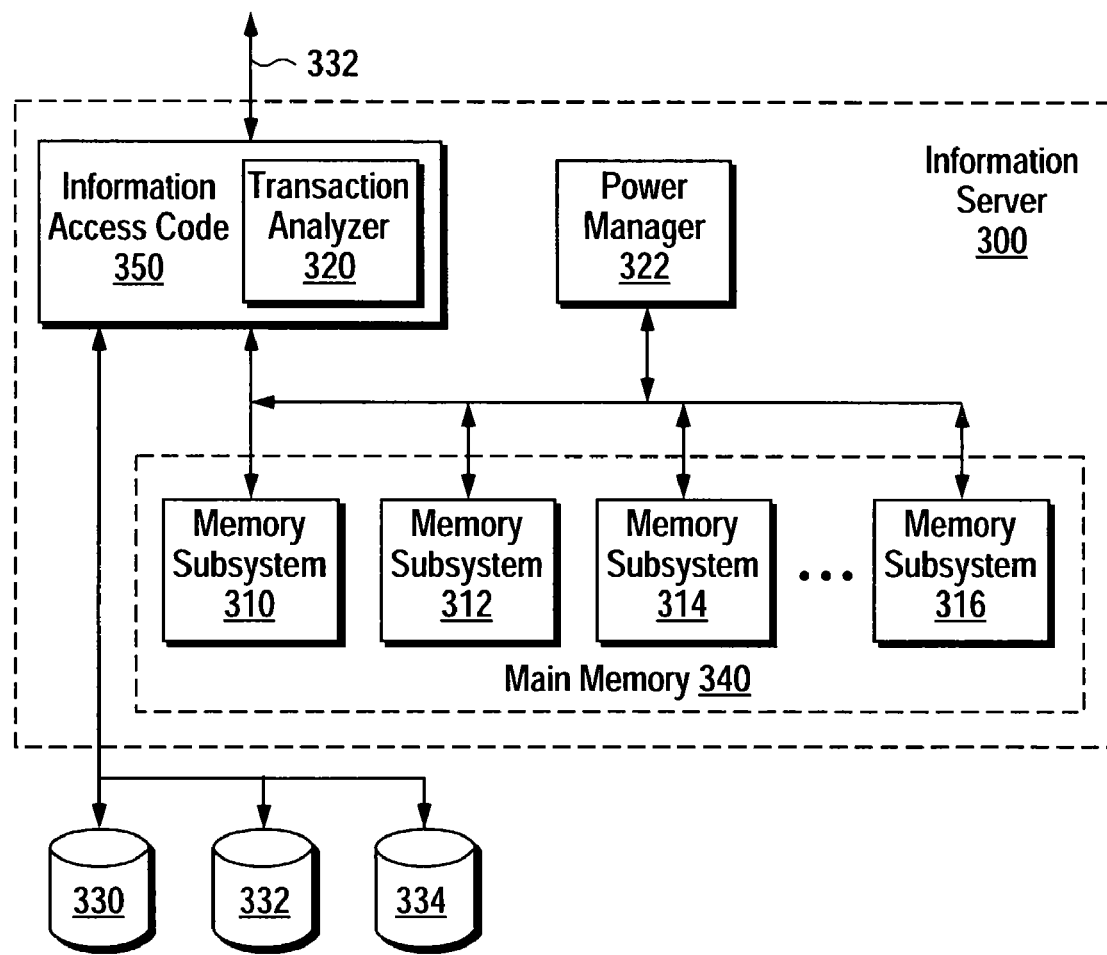
FIG. 4 shows an information server that incorporates the present teachings.

FIG. 4 shows an information server 300 according to the present teachings. The information server 300 enables access to data that is stored in a set of persistent storage devices 330-334. The information server 300 includes a main memory 340, a set of information access code 350 that includes a transaction analyzer 320, and a power manager 322.

The information access code 350 obtains access transactions via a communication path 332. The information access code 350 performs read/write accesses to the persistent storage devices 330-334 as needed to service the received access transactions.

The information access code 350 uses the main memory 340 as a cache for information stored in the persistent storage devices 330-334. The main memory 340 is subdivided into a set of memory subsystems 310-316. The power status of each of the memory subsystems 310-316 is independently controllable by the power manager 322. For example, the power manager 322 may independently switch on/off each of the memory subsystems 310-316 or place each of the memory subsystems 310-316 in power reduction mode or remove each of the memory subsystems 310-316 from a power reduction mode. In one embodiment, the main memory 340 is comprised of random access memories that are arranged into banks wherein the power state of each bank is individually controllable.

The transaction analyzer 320 examines each access transaction received via the communication path 332. The transaction analyzer 320 determines a priority metric for each access transaction. The priority metric assigned to an access transaction determines which of the memory subsystems 310-316 is to be used to cache data associated with the access transaction.

Each of the memory subsystems 310-316 is assigned a rank for use in power adaptation in the information server 300. The power manager 322 monitors the power consumption of the information server 300, load conditions, and/or environmental and/or other conditions associated with the information server 300 and performs power adaptation when appropriate. The power manager 322 selects the memory subsystems 310-316 to be powered down or to be placed in a power reduction state on the basis of their assigned rank. In addition, the power manager 322 selects the memory subsystems 310-316 that are to be restored to a full power state on the basis of their assigned rank.

The power manager 322 may notify the information access code 350 of upcoming changes in the power status of the memory subsystems 310-316 so that the corresponding cached data may be handled accordingly.

The information access code 350 selects the active memory subsystems 310-316 to cache data for incoming access transactions based on the priority metrics assigned to the incoming access transaction by the transaction analyzer 320 and the ranks of the memory subsystems 310-316. For example, the memory subsystems 310-316 having a high rank may be selected for the access transactions having a high priority metric and the memory subsystems 310-316 having a low rank may be selected for the access transactions assigned a low priority metric.

The present techniques may increase the likelihood that data for high priority access transactions will be cached in active memory subsystems because the memory subsystems 310-316 that handle lower priority transactions are powered down first. This minimizes the performance degradation that might otherwise occur if the memory subsystems 310-316 were to be powered down without regard to their rank, i.e. the priority of access transactions whose data they cache.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An information system, comprising:
   a persistent storage;
   a set of storage access subsystems each for use in accessing the persistent storage;
   a power manager coupled to the storage access subsystems, the power manager selectively changes the power state of each storage access subsystem based on a power management rank assigned to each storage access subsystem; and
   a transaction analyzer that determines a priority metric for an incoming access transaction to the persistent storage and that transfers the incoming access transaction to one of the storage access subsystems by matching the priority metric to the power management ranks.

2. The information system of claim 1, wherein the priority metric is based on a frequency of occurrence for the incoming access transaction.

3. The information system of claim 1, wherein the priority metric is based on a frequency of access of a database table referenced in the incoming access transaction.

4. The information system of claim 1, wherein the priority metric is based on a dollar cost associated with the incoming access transaction.

5. The information system of claim 1, wherein the priority metric is based on a computational complexity associated with performing the incoming access transaction.

6. The information system of claim 5, wherein the computational complexity is indicated by a number of database tables in the persistent storage that are referenced by the incoming access transaction.

7. The information system of claim 5, wherein the computational complexity is indicated by a number of field matches specified in the incoming access transaction to database tables in the persistent storage.

8. The information system of claim 1, wherein the priority metric is based on a set of query constraints contained in the incoming access transaction.

9. The information system of claim 8, wherein the priority metric is based on a size of a database table in the persistent storage to which the query constraints are to be applied.

10. A method for priority analysis of access transactions in an information system, comprising:
   determining, by a server, a priority metric for an incoming access transaction to a persistent storage in the information system;
   selecting, by the server, which of a set of storage access subsystems is to be used when performing the incoming access transaction by matching the priority metric to a power management rank for each storage access subsystem; and
   selectively changing, by the server, the power state of each storage access subsystem based on the power management rank assigned to each storage access subsystem.

11. The method of claim 10, wherein determining the priority metric includes determining a frequency of occurrence for the incoming access transaction.

12. The method of claim 10, wherein determining the priority metric includes determining a frequency of access of a database table referenced in the incoming access transaction.

13. The method of claim 10, wherein determining the priority metric includes determining a dollar cost associated with the incoming access transaction.

14. The method of claim 10, wherein determining the priority metric includes determining a computational complexity associated with performing the incoming access transaction.

15. The method of claim 14, wherein the computational complexity is indicated by a number of database tables in the persistent storage that are referenced by the incoming access transaction.

16. The method of claim 14, wherein the computational complexity is indicated by a number of field matches specified in the incoming access transaction to database tables in the persistent storage.

17. The method of claim 10, wherein determining the priority metric includes determining the priority metric in response to a set of query constraints contained in the incoming access transaction.

18. The method of claim 17, wherein determining the priority metric includes determining a size of a database table in the persistent store to which the query constraints are to be applied.

* * * * *